United States Patent
Takasuga et al.

(10) Patent No.: US 12,545,287 B2
(45) Date of Patent: Feb. 10, 2026

(54) VEHICLE BEHAVIOR CONTROL DEVICE

(71) Applicant: TOYOTA JIDOSHA KABUSHIKI KAISHA, Toyota (JP)

(72) Inventors: Kazuki Takasuga, Toyota (JP); Yuya Onozuka, Toyota (JP); Shirou Monzaki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/431,617

(22) Filed: Feb. 2, 2024

(65) Prior Publication Data
US 2024/0270279 A1    Aug. 15, 2024

(30) Foreign Application Priority Data

Feb. 10, 2023  (JP) .................. 2023-019118
Mar. 27, 2023  (JP) .................. 2023-049947
May 1, 2023    (JP) .................. 2023-075551

(51) Int. Cl.
  B60W 60/00     (2020.01)
  B60W 10/18     (2012.01)
  (Continued)

(52) U.S. Cl.
  CPC .......... B60W 60/001 (2020.02); B60W 10/18 (2013.01); B60W 10/20 (2013.01); B62D 7/159 (2013.01); G06F 30/20 (2020.01)

(58) Field of Classification Search
  USPC .......................................................... 701/23
  See application file for complete search history.

(56) References Cited

U.S. PATENT DOCUMENTS

| 7,702,442 B2 * | 4/2010 | Takenaka .............. B60W 40/10 701/41 |
| 2009/0118905 A1 * | 5/2009 | Takenaka ................ B62D 6/04 701/41 |

(Continued)

FOREIGN PATENT DOCUMENTS

| EP | 1 136 344 A2 | 9/2001 |
| JP | 2001-334951 A | 12/2001 |

(Continued)

OTHER PUBLICATIONS

Notice of Allowance issued Jul. 17, 2025 in United States U.S. Appl. No. 18/435,256.

*Primary Examiner* — Adam D Tissot
(74) *Attorney, Agent, or Firm* — Sughrue Mion, PLLC

(57) ABSTRACT

A vehicle behavior control device comprises an actuator group including one or more actuators configured to drive a vehicle having four wheels; and a vehicle behavior controller configured to control operation of the actuator group, wherein the vehicle behavior controller is configured to: apply a target motion to a two-wheeled model of a two-wheeled vehicle simulating the vehicle to calculate a velocity vector of a front wheel and a rear wheel, the velocity vector being necessary for obtaining the target motion, convert each of the velocity vector of the front wheel and the rear wheel into a centroid behavior, calculate a turning angle and a braking/driving force for each of the four wheels, based on the centroid behavior, and control the operation of the actuator group to enable each of the four wheels to output the turning angle and the braking/driving force that are calculated.

3 Claims, 5 Drawing Sheets

(51) Int. Cl.
  *B60W 10/20*     (2006.01)
  *B62D 7/15*      (2006.01)
  *G06F 30/20*     (2020.01)

(56) References Cited

U.S. PATENT DOCUMENTS

2019/0283733 A1\* 9/2019 Takei ................. B60G 17/0195
2022/0332329 A1  10/2022 Katsuyama et al.

FOREIGN PATENT DOCUMENTS

| | | |
|---|---|---|
| JP | 2006-347197 A | 12/2006 |
| JP | WO2007/074717 A1 | 7/2007 |
| JP | 2012-56512 A | 3/2012 |
| JP | 2013-147097 A | 8/2013 |
| JP | 2021-75119 A | 5/2021 |
| JP | 2022-021715 A | 2/2022 |
| JP | 2022-165535 A | 11/2022 |
| WO | 2007/074717 A1 | 7/2007 |
| WO | 2024/002483 A1 | 1/2024 |

\* cited by examiner

US 12,545,287 B2

VEHICLE BEHAVIOR CONTROL DEVICE

CROSS REFERENCE TO RELATED APPLICATION

This application claims priority to Japanese Patent Application No. 2023-19118 filed on Feb. 10, 2023, Japanese Patent Application No. 2023-49947 filed on Mar. 27, 2023, and Japanese Patent Application No. 2023-75551 filed on May 1, 2023, which is incorporated herein by reference in its entirety including the specification, claims, drawings, and abstract.

TECHNICAL FIELD

This specification discloses a vehicle behavior control device that controls a behavior of a vehicle having four wheels.

BACKGROUND

Conventionally, a large number of logic for analyzing the behavior of a vehicle having four wheels has been proposed. However, in the case of a four-wheeled vehicle, the four wheels behave differently from each other. For example, tire slip angles are different for each of the four wheels. Therefore, it is difficult to construct the arithmetic logic for analyzing the behavior of the four-wheeled vehicle. Further, even when such arithmetic logic can be constructed, there is a problem that the amount of arithmetic operation becomes enormous.

Therefore, it is conceivable to analyze the behavior of the vehicle using a two-wheeled model or a simplified model in which the tire slip angle is ignored. However, such a simple model does not take into account the ground contact load and the tire slip angle. Therefore, in order to calculate a control command value for an actual vehicle from a steering angle and a braking/driving force obtained by analysis using a simple model, it is necessary to separately construct logic for calculating a control command value in consideration of a ground contact load and a tire slip angle. When such calculation logic is constructed, the development period and development cost increase.

Patent Document 1 discloses a technology in which six parts of the center of gravity of a vehicle are calculated from slip angles, yaw rates, and yaw accelerations at the center of gravity of the vehicle, three parts of tires of four wheels are calculated from six parts of the center of gravity, and actuators are driven based on the obtained three parts of tires. By using such a technique, it is possible to appropriately control the driving of each of the four wheels.

However, in the technology of Patent Document 1, a slip angle or the like in a centroid of a vehicle is input. Therefore, the analysis result using the simplified model could not be input to the apparatus described in Patent Document 1. As a result, conventionally, there is no technology capable of appropriately controlling the behavior of a four-wheeled vehicle with a simple configuration.

Accordingly, this specification discloses the vehicle behavior control device capable of appropriately controlling the behavior of a four-wheeled vehicle with a simple configuration.

CITATION LIST

PATENT DOCUMENT 1: JP.2022-165535.A

SUMMARY

A vehicle behavior control device disclosed herein comprises an actuator group including one or more actuators configured to drive a vehicle having four wheels; and a vehicle behavior controller configured to control operation of the actuator group, wherein the vehicle behavior controller is configured to: apply a target motion to a two-wheeled model of a two-wheeled vehicle simulating the vehicle to calculate a velocity vector of a front wheel and a velocity vector of a rear wheel, the velocity vector being necessary for obtaining the target motion, convert each of the velocity vector of the front wheel and the velocity vector of the rear wheel into a centroid behavior represented by a velocity vector at a centroid of the vehicle and a yaw rate at the centroid of the vehicle, calculate a turning angle and a braking/driving force for each of the four wheels based on the centroid behavior, and control the operation of the actuator group to enable each of the four wheels to output the turning angle and the braking/driving force that are calculated.

Since the model of the two-wheeled vehicle is used, the velocity vectors of the front wheels and the rear wheels can be calculated by simple calculation. Further, the six-component force at center of gravity process proposed by Patent Document 1 or the like can be utilized by converting the velocity vectors of the front wheel and the rear wheel into velocity vectors and yaw rates in the vehicle centroid. As a result, the behavior of the four-wheeled vehicle can be appropriately controlled with a simple configuration.

The velocity vector of the front wheel may be represented by a steering angle of the front wheel and a velocity of the front wheel, the velocity vector of the rear wheel may be represented by a steering angle of the rear wheel and a velocity of the rear wheel, the centroid behavior may be represented by a vehicle body slip angle, a vehicle velocity, and the yaw rate at the centroid of the vehicle, and the vehicle behavior controller may be configured to calculate the centroid behavior according to the following equations (3) to (5):

$$B = \frac{Lr}{Lwb}Bf + \frac{Lf}{Lwb}Br \tag{3}$$

$$\Theta = \frac{Vv}{Lwb}Bf + \frac{Vv}{Lwb}Br \tag{4}$$

$$Vv = Vf = Vr \tag{5}$$

where Lwb is a distance between the front wheel and the rear wheel, Lf is a distance between the front wheel and the centroid, and Lr is a distance between the rear wheel and the centroid.

With such a configuration, the velocity vectors of the front wheel and the rear wheel are appropriately converted into the velocity vector and the yaw rate in the vehicle centroid.

The target motion may include a curvature of a path drawn by the front wheel, a curvature of a path drawn by the rear wheel, and a vehicle velocity, the velocity vector of the front wheel is represented by a steering angle of the front wheel and a velocity of the front wheel the velocity vector of the rear wheel may be represented by a steering angle of the rear wheel and a velocity of the rear wheel, and the vehicle behavior controller may be configured to calculate the velocity vector of the front wheel and the velocity vector of the rear wheel according to the following equations (1) and (2):

$$Kf = \frac{1}{Lwb} \times \frac{\sin(Bf - Br)}{\cos Br} + \frac{1}{Vf}\frac{dBf}{dt} \qquad (1)$$

$$Kr = \left(\frac{1}{Lwb} \times \frac{\sin(Bf - Br)}{\cos Br}Vf + \frac{dBr}{dt}\right)\frac{\cos Br}{\cos Bf}\frac{1}{Vf} \qquad (2)$$

where Lwb is a distance between the front wheel and the rear wheel.

With such a configuration, the velocity vectors of the front wheels and the rear wheels necessary for obtaining the target motion can be appropriately calculated.

The one or more actuators may include at least a drive actuator configured to rotate the four wheels, a brake actuator configured to generate a braking force, a front wheel steering actuator configured to steer the front wheels, and a rear wheel steering actuator configured to steer the rear wheels.

By operating the actuator, the behavior of the vehicle can be appropriately controlled.

According to the technology disclosed in this specification, the behavior of the four-wheeled vehicle can be appropriately controlled with a simple configuration.

BRIEF DESCRIPTION OF DRAWINGS

Embodiment(s) of the present disclosure will be described based on the following figures, wherein.

DESCRIPTION OF EMBODIMENT

Figure 1:
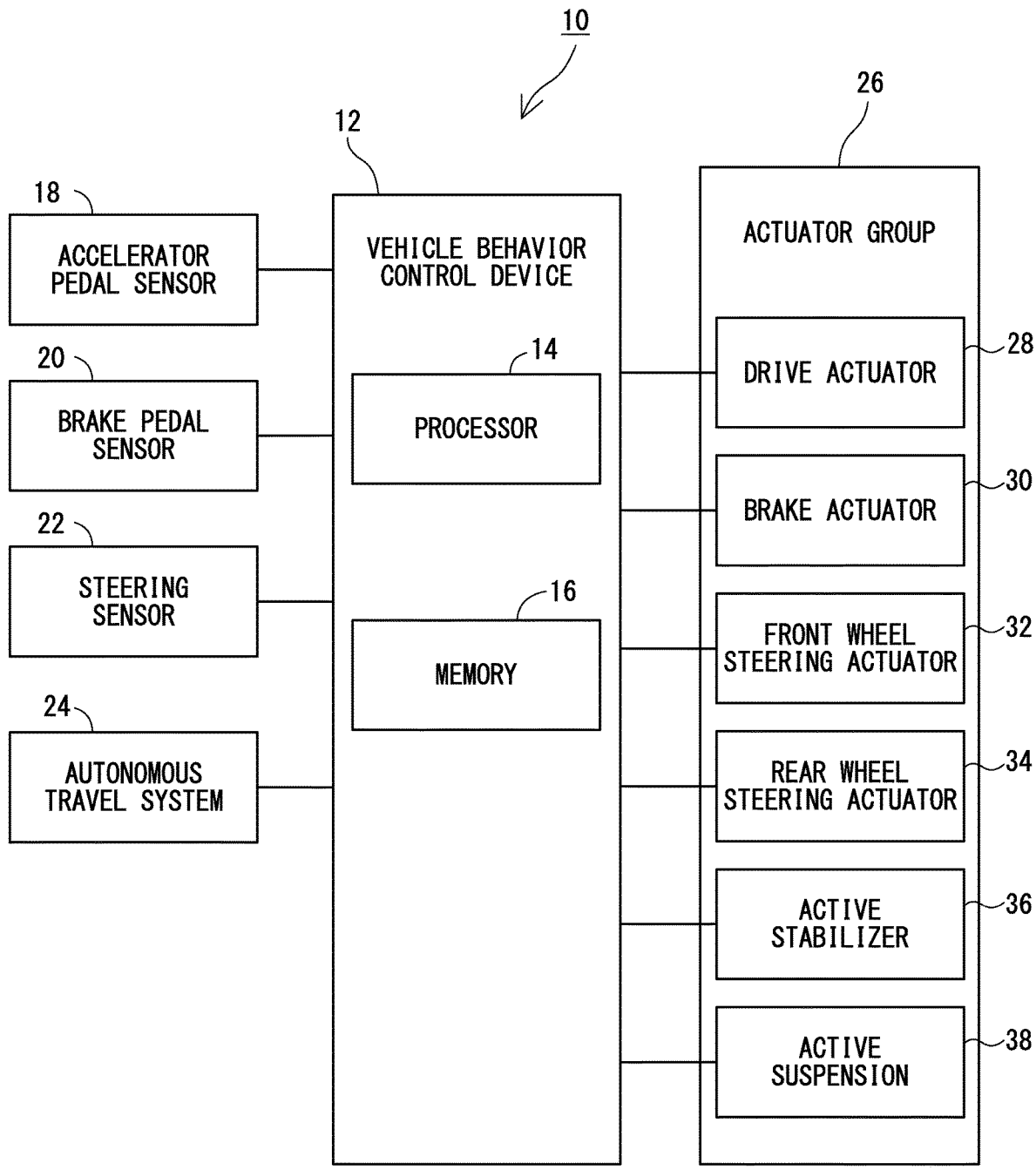
FIG. 1 is a block diagram showing a configuration of a vehicle behavior control device.

Hereinafter, the configuration of the vehicle behavior control device 10 will be described with reference to the drawings. FIG. 1 is a block diagram showing a configuration of a vehicle behavior control device 10. The vehicle behavior control device 10 shown in FIG. 1 is applied to a vehicle having four wheels.

The vehicle behavior control device 10 controls the behavior of the vehicle based on the driving instruction. The driving instruction is an instruction for acceleration/deceleration and steering of the vehicle. For example, a driver of a vehicle operates an accelerator pedal, a brake pedal, and a steering wheel to output a driving instruction. The driver's operation amount is detected by the accelerator pedal sensor 18, the brake pedal sensor 20, and the steering sensor 22, and is input to the vehicle behavior controller 12 as a driving instruction. When the vehicle is autonomously traveling by the autonomous travel system 24, the autonomous travel system 24 outputs a driving instruction. The autonomous travel system 24 is a system for executing automatic driving or advanced driving support. The autonomous travel system 24 includes a plurality of sensors and a computer, and automatically controls acceleration/deceleration and steering of the vehicle.

The vehicle behavior controller 12 controls the behavior of the vehicle, in particular, the behavior of the four wheels, based on the driving instruction. The details of the control by the vehicle behavior controller 12 will be described later. The vehicle behavior controller 12 is physically a computer that includes a processor 14 and a memory 16. In FIG. 1, the vehicle behavior controller 12 is illustrated as a single computer. However, the vehicle behavior controller 12 may be composed of a plurality of physically separate computers. Also, some or all of the vehicle behavior controller 12 may function as part of the autonomous travel system 24. Further, a portion of the vehicle behavior controller 12 may be located outside the vehicle. In this case, the vehicle behavior controller 12 has a wireless communication function.

The vehicle control actuator group 26 includes a plurality of actuators for controlling the behavior of the vehicle. For example, the vehicle control actuator group 26 includes a drive actuator 28, a brake actuator 30, a front wheel steering actuator 32, a rear wheel steering actuator 34, an active stabilizer 36, and an active suspension 38.

The drive actuator 28 controls, for example, the amount of air supplied to the engine (throttle opening degree) in accordance with a control command from the vehicle behavior controller 12, thereby controlling the driving force of the vehicle. When the vehicle is equipped with a motor (not shown) as a power source, the vehicle behavior controller 12 outputs a control command to the motor to control the driving force. In this case, the motor corresponds to the drive actuator 28. The drive actuator 28 may change the distribution of the drive force for the front wheels and the drive force for the rear wheels. The brake actuator 30 is configured to control a brake system (not shown) in accordance with, for example, a control command from the vehicle behavior controller 12, thereby controlling a braking force of the vehicle.

The front wheel steering actuator 32 is configured to change the steering angle of the front wheels in accordance with a control command from the vehicle behavior controller 12. The rear wheel steering actuator 34 is configured to change the steering angle of the rear wheels in accordance with a control command from the vehicle behavior controller 12.

The active stabilizer 36 is configured to control a twist angle of a stabilizer bar (not shown) in accordance with a control command from the vehicle behavior controller 12. The active suspension 38 is configured to control suspension characteristics in accordance with a control command from the vehicle behavior controller 12.

Figure 2:
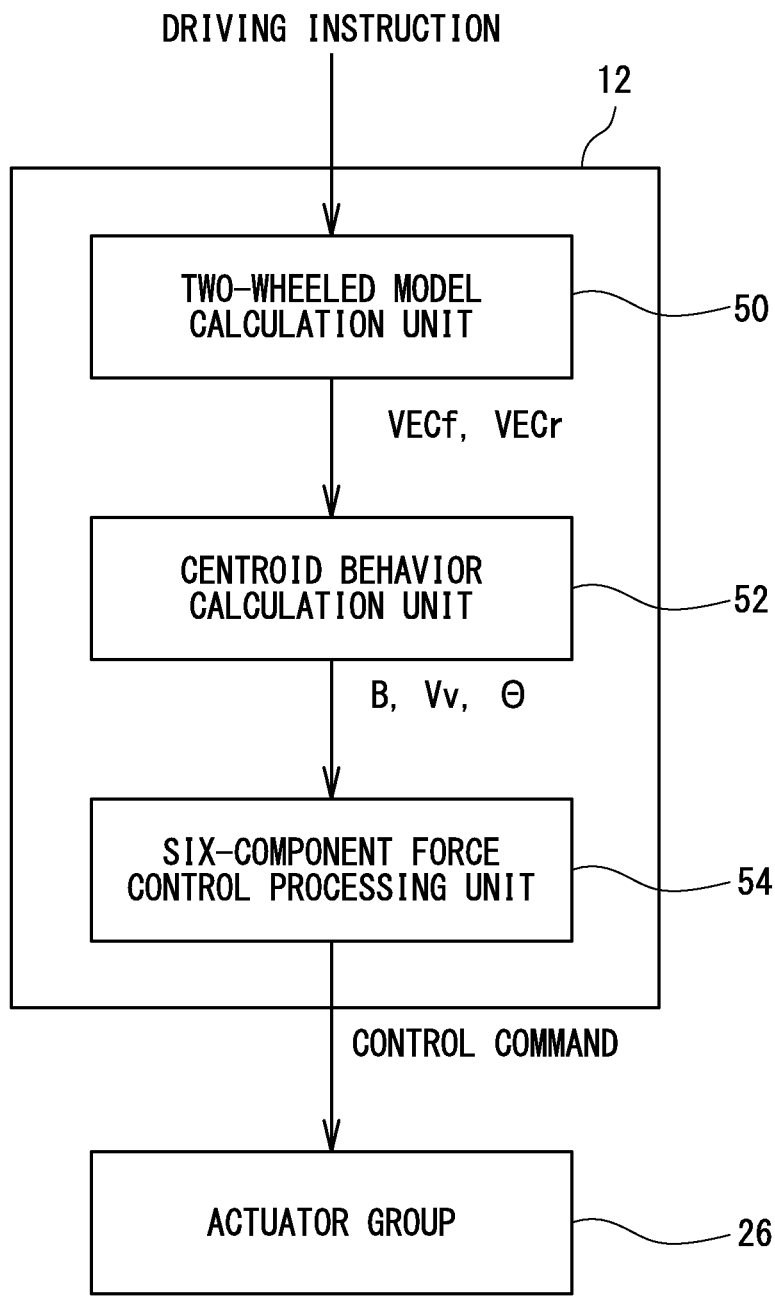
FIG. 2 is a functional block diagram of a vehicle behavior controller.

Next, the control of the vehicle behavior by the vehicle behavior controller 12 will be described. FIG. 2 is a functional block diagram of the vehicle behavior controller 12. As shown in FIG. 2, the vehicle behavior controller 12 functions as a two-wheeled model calculation unit 50, a centroid behavior calculation unit 52, and an six-component force control processing unit 54.

The two-wheeled model calculation unit 50 specifies a target motion of the vehicle based on the driving instruction. As described above, the driving instruction is an instruction for acceleration/deceleration and steering of the vehicle. The two-wheeled model calculation unit 50 specifies a target motion of the vehicle, specifically, a travel path of the vehicle, a vehicle velocity, an acceleration, and the like, from the driving instruction. Subsequently, the two-wheeled model calculation unit 50 applies the target motion to the two-wheeled model 60, and calculates velocity vectors VECf and VECr of the front wheel 40 and the rear wheel 42, respectively, necessary for obtaining the target motion.

Figure 3:
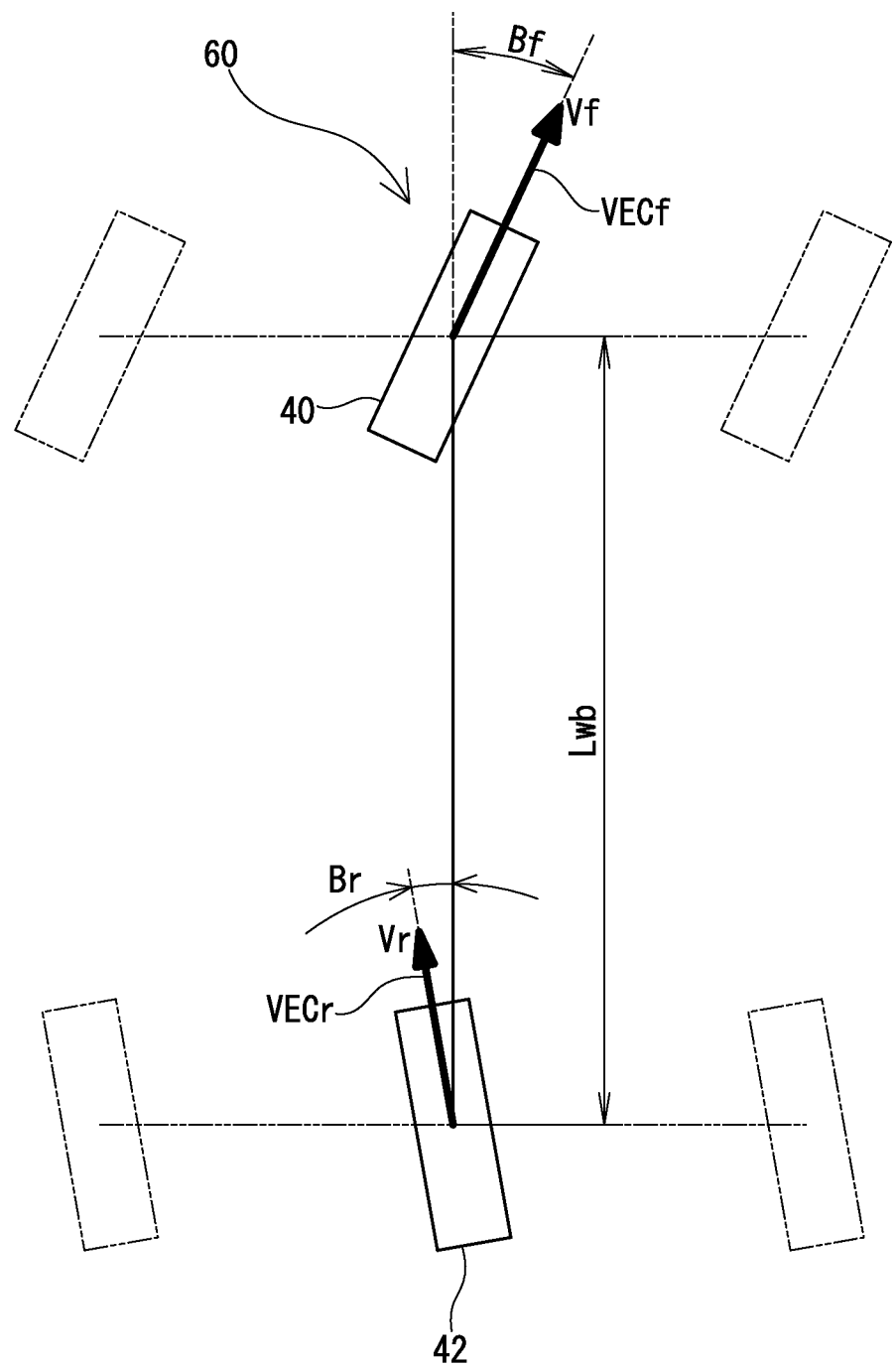
FIG. 3 is a schematic diagram showing a two-wheeled model 60.

The two-wheeled model is a model of a two-wheeled vehicle for simulating a vehicle, and is a model in which a tire slip angle of a wheel is regarded as zero. FIG. 3 is a diagram showing an example of the two-wheeled model 60 60. In the two-wheeled model 60 60, the motion of the vehicle is represented by a velocity vector VECf of the front wheel 40 and a velocity vector VECr of the rear wheel 42. The velocity vector VECf of the front wheel 40 is defined by the front wheel steering angle Bf and the front wheel velocity Vf. The velocity vector VECr of the rear wheel 42 is defined by the rear wheel steering angle Br and the rear wheel velocity Vr.

The curvature Kf of the path drawn by the front wheel 40 and the curvature Kr of the path drawn by the rear wheel 42 are expressed by the following equations (1) and (2). In the equations (1) and (2), Lwb is a wheel base and is a known constant. Further, the front wheel velocity Vf and the rear wheel velocity Vr are calculated from the driving instruction and equal to each other.

$$Kf = \frac{1}{Lwb} \times \frac{\sin(Bf - Br)}{\cos Br} + \frac{1}{Vf}\frac{dBf}{dt} \quad (1)$$

$$Kr = \left(\frac{1}{Lwb} \times \frac{\sin(Bf - Br)}{\cos Br} Vf + \frac{dBr}{dt}\right)\frac{\cos Br}{\cos Bf}\frac{1}{Vf} \quad (2)$$

The two-wheeled model calculation unit 50 acquires the velocity vectors VECf and VECr necessary for obtaining the target motion according to the above-described equations (1) and (2). The calculated velocity vectors VECf and VECr are output to the centroid behavior calculation unit 52.

The centroid behavior calculation unit 52 calculates the velocity vector VECg and the yaw rate $\theta$ of the centroid Pg of the vehicle as the centroid behavior based on the velocity vectors VECf and VECr calculated by the two-wheeled model calculation unit 50. The velocity vector VECg is represented by the vehicle velocity Vv and the vehicle body slip angle B in the centroid Pg.

Figure 4:
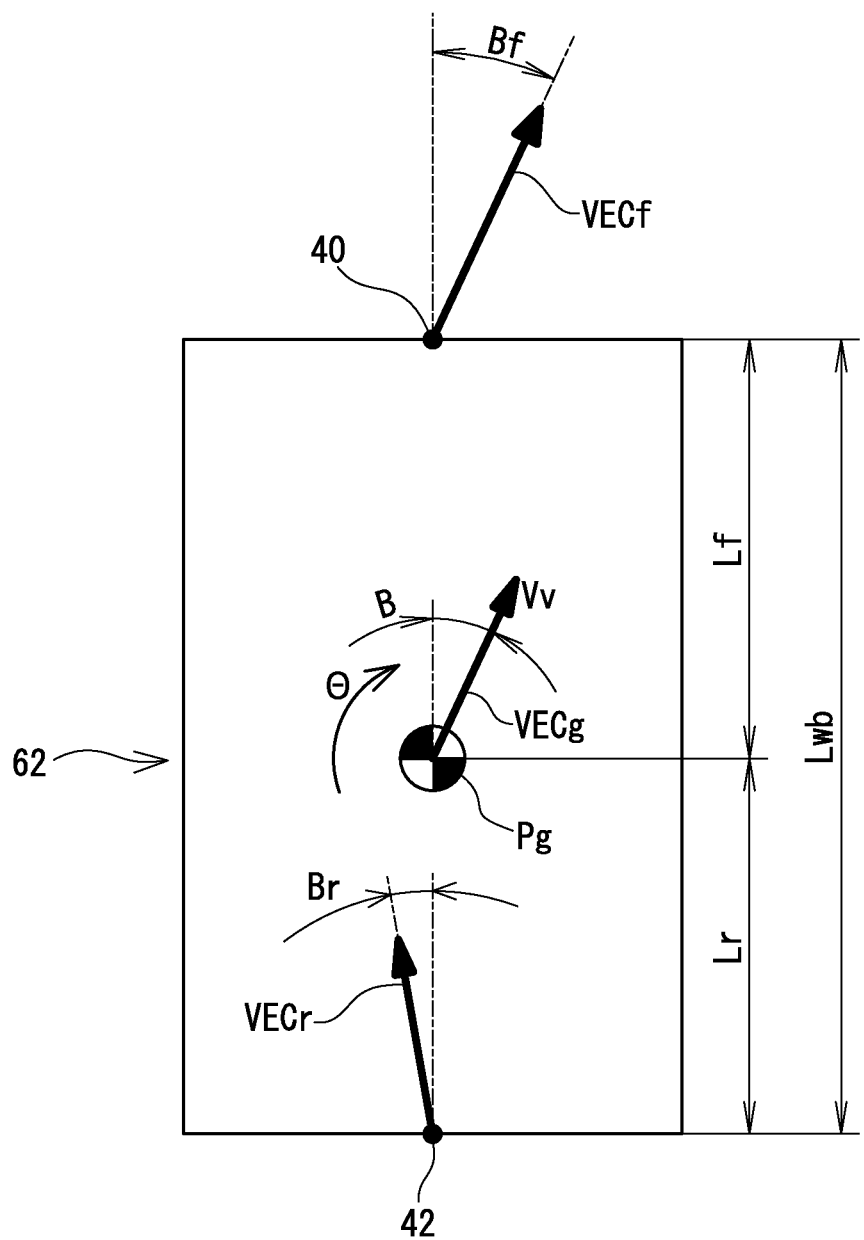
FIG. 4 is a schematic diagram showing a rigid body model.

FIG. 4 is a schematic diagram illustrating the centroid behavior. The centroid behavior calculation unit 52 calculates the centroid behavior by converting the analysis result of the two-wheeled model 60 60 into the lower-order rigid body model 62. More specifically, the centroid behavior calculation unit 52 applies the front wheel steering angle Bf, the front wheel velocity Vf, the rear wheel steering angle Br, and the rear wheel velocity Vr obtained by the two-wheeled model 60 60 to the following equations (3) to (5). In the equations (3) to (5), the distance Lf is the distance from the centroid Pg to the front wheel 40, and the distance Lr is the distance from the centroid Pg to the rear wheel 42. The calculated centroid behavior, i.e., the velocity vector VECg and the yaw rate $\theta$ in the centroid Pg, is output to the six-component force control processing unit 54.

$$B = \frac{Lr}{Lwb}Bf + \frac{Lf}{Lwb}Br \quad (3)$$

$$\Theta = \frac{Vv}{Lwb}Bf + \frac{Vv}{Lwb}Br \quad (4)$$

$$Vv = Vf = Vr \quad (5)$$

Figure 5:
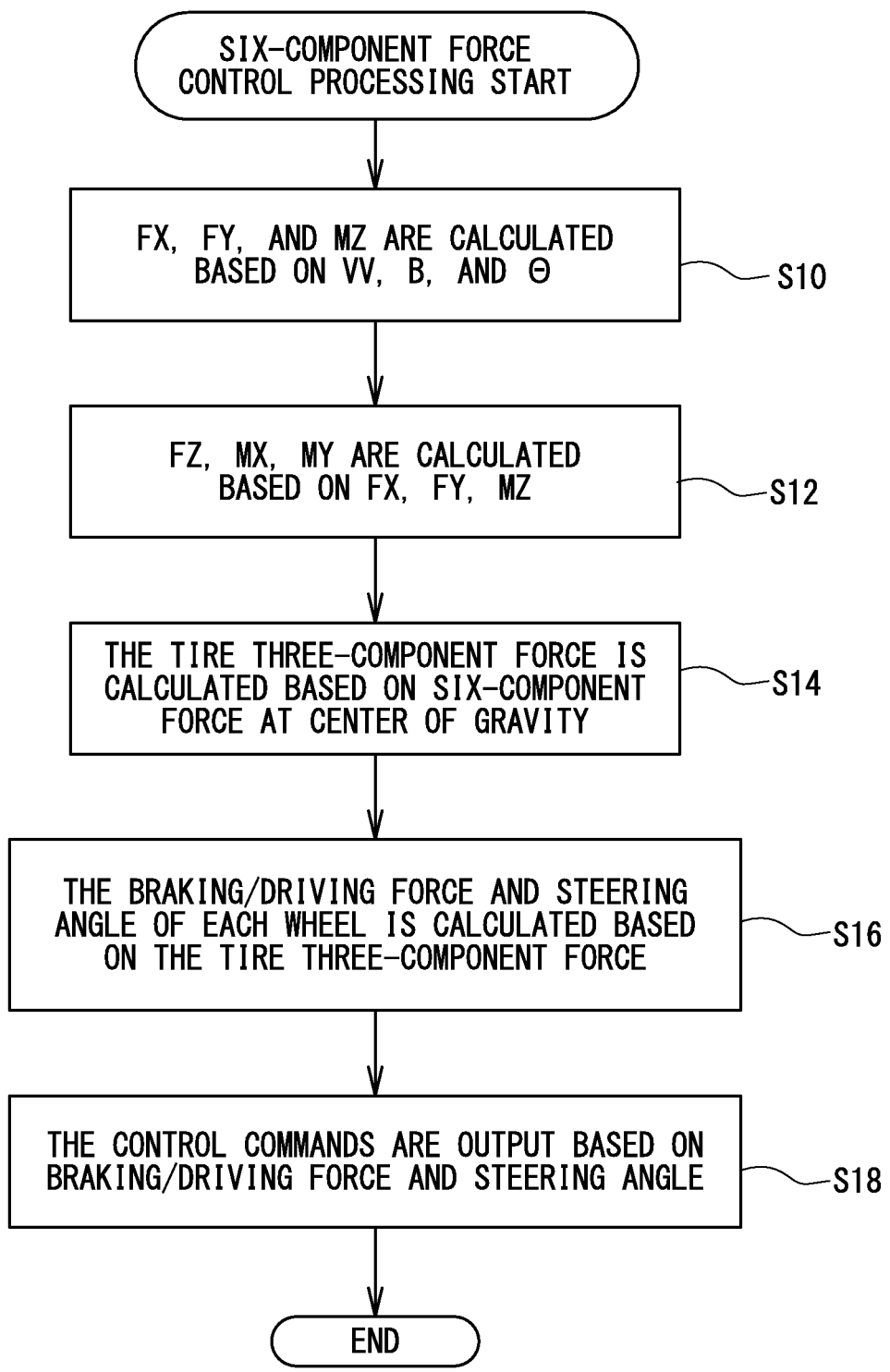
FIG. 5 is a flowchart showing processing by an six-component force control processing unit.

The six-component force control processing unit 54 controls the steering angles, braking forces and driving forces (hereinafter collectively referred to as "braking/driving force") of the four wheels based on the centroid behavior. The six-component force control processing unit 54 calculates a six-minute force (hereinafter referred to as "six-component force at center of gravity") at the centroid Pg of the vehicle based on the vehicle body slip angle B and the like. The six-component force control processing unit 54 outputs a control command to the vehicle control actuator group 26 so that the calculated six-component force at center of gravity is output. The six-component force control processing unit 54 can be constructed based on, for example, the technology disclosed in JP-A-2022-021715 and JP-A-2022-165535. Therefore, only the outline of the six-component force control processing unit 54 will be briefly described below. FIG. 5 is a flowchart showing the flow of six-component force control processing.

The six-component force at center of gravity includes a longitudinal force Fx, a lateral force Fy, a vertical force Fz, a roll moment Mx, a pitch moment My, and a yaw moment Mz in the centroid Pg of the vehicle. The six-component force control processing unit 54 calculates the plane three-component force by applying a well-known conversion equation to the vehicle body slip angle B, the vehicle velocity Vv, and the yaw rate $\theta$ (S10). The plane three-component force includes a longitudinal force Fx, a lateral force Fy, and a yaw moment Mz.

Subsequently, the six-component force control processing unit 54 calculates three-component force on spring by applying the obtained plane three-component force to the inertial motion model (S12). The inertial motion model is a vehicle model considering inertial force and suspension reaction force. The three-component force on spring includes a vertical force Fz, a roll moment Mx, and a pitch moment My.

six-component force at center of gravity (Fx, Fy, Fz, Mx, My, Mz) is composed of three-component force on spring (Fz, Mx, My) and plane three-component force (Fx, Fy, Mz). The six-component force control processing unit 54 calculates a tire three-component force for each of the four wheels based on the calculated six-component force at center of gravity (S14). The tire three-component force includes a longitudinal force Fxi, a lateral force Fyi, and a vertical force Fzi of the tire.

Subsequently, the six-component force control processing unit 54 calculates the braking/driving force and the steering angle of each of the four wheels based on the calculated tire three-component force (S16). Specifically, the six-component force control processing unit 54 calculates the braking/driving force from the longitudinal force Fxi of the tire and calculates the steering angle from the lateral force Fyi of the tire. Further, the six-component force control processing unit 54 calculates a control command for obtaining the calculated braking/driving force and steering angle, and outputs the control command to the vehicle control actuator group 26 (S18). The vehicle control actuator group 26 operates according to the control command, whereby the vehicle operates according to the target motion.

As apparent from the above description, according to the vehicle behavior controller 12 disclosed in the present specification, the braking/driving force and the steering angle of the four wheels can be appropriately controlled, whereby the vehicle behavior according to the target motion can be obtained. Further, the vehicle behavior controller 12 disclosed in the present specification first applies the target motion to the two-wheeled model 60 60 and calculates velocity vectors VECf and VECr of the front wheel 40 and the rear wheel 42 in the two-wheeled model 60 60. By using the two-wheeled model 60 60 in this manner, the calculation amount of the vehicle behavior controller 12 can be significantly reduced as compared with the case of using the four-wheel model.

Further, the vehicle behavior controller 12 disclosed in the present specification converts the analysis result of the two-wheeled model 60 60 into a lower-order rigid body model 62, and calculates a centroid behavior. By calculating the centroid behavior in this manner, the six-component force control processing unit 54 can be used. That is, as described above, the six-component force control processing unit 54 is constructed based on the well-known technology, that is, the technology disclosed in JP-A-2022-021715 and JP-A-2022-165535. The vehicle behavior controller 12 disclosed in the present specification converts the analysis result of the two-wheeled model 60 60 into a lower-order rigid body model 62 in order to effectively use the six-component force control processing unit 54, which is the well-known technology. Then, by calculating the centroid behavior based on the rigid body model 62, the six-component force control processing unit 54, which is a well-known technology, can be used. Since the six-component force control processing unit 54, which is a well-known technology, can be used, it is not necessary to design complex arithmetic logic again, and the development cost of the vehicle behavior controller 12 can be greatly reduced.

REFERENCE SIGNS LIST

10 vehicle behavior control device, 12 vehicle behavior controller, 14 processor, 16 memory, 18 accelerator pedal sensor, 20 brake pedal sensor, 22 steering sensor, 24 autonomous travel system, 26 actuator group, 28 drive actuator, 30 brake actuator, 32 front wheel steering actuator, 34 rear wheel steering actuator, 36 active stabilizer, 38 active suspension, 40 front wheel, 42 rear wheel, 52 centroid behavior calculation unit, 54 six-component force control processing unit, 60 two-wheeled model, 62 rigid body model, B vehicle body slip angle, Bf front wheel steering angle, Br rear wheel steering angle, Kf curvature of a path drawn by the front wheel, Kr curvature of a path drawn by the rear wheel, Pg centroid, Vf front wheel velocity, Vr rear wheel velocity, Vv vehicle velocity, θ yaw rate.

The invention claimed is:

1. A vehicle behavior control device comprising:
an actuator group including one or more actuators configured to drive a vehicle having four wheels; and
a vehicle behavior controller configured to control operation of the actuator group, wherein
the vehicle behavior controller is configured to:
apply a target motion to a two-wheeled model of a two-wheeled vehicle simulating the vehicle to calculate a velocity vector of a front wheel and a velocity vector of a rear wheel, the velocity vector being necessary for obtaining the target motion,
convert each of the velocity vector of the front wheel and the velocity vector of the rear wheel into a centroid behavior represented by a velocity vector at a centroid of the vehicle and a yaw rate at the centroid of the vehicle,
calculate a turning angle and a braking/driving force for each of the four wheels based on the centroid behavior, and
control the operation of the actuator group to enable each of the four wheels to output the turning angle and the braking/driving force that are calculated, wherein
the target motion includes a curvature of a path drawn by the front wheel, a curvature of a path drawn by the rear wheel, and a vehicle velocity,
the velocity vector of the front wheel is represented by a steering angle of the front wheel and a velocity of the front wheel,
the velocity vector of the rear wheel is represented by a steering angle of the rear wheel and a velocity of the rear wheel, and
the vehicle behavior controller is configured to calculate the velocity vector of the front wheel and the velocity vector of the rear wheel according to the following equations (1) and (2):

$$Kf = \frac{1}{Lwb} \times \frac{\sin(Bf - Br)}{\cos Br} + \frac{1}{Vf}\frac{dBf}{dt} \quad (1)$$

$$Kr = \left(\frac{1}{Lwb} \times \frac{\sin(Bf - Br)}{\cos Br}Vf + \frac{dBr}{dt}\right)\frac{\cos Br}{\cos Bf}\frac{1}{Vf} \quad (2)$$

where Lwb is a distance between the front wheel and the rear wheel.

2. The vehicle behavior control device according to claim 1, wherein
the centroid behavior is represented by a vehicle body slip angle, a vehicle velocity, and the yaw rate at the centroid of the vehicle, and
the vehicle behavior controller is configured to calculate the centroid behavior according to the following equations (3) to (5):

$$B = \frac{Lr}{Lwb}Bf + \frac{Lf}{Lwb}Br \quad (3)$$

$$\Theta = \frac{Vv}{Lwb}Bf + \frac{Vv}{Lwb}Br \quad (4)$$

$$Vv = Vf = Vr \quad (5)$$

where Lwb is the distance between the front wheel and the rear wheel, Lf is a distance between the front wheel and the centroid, and Lr is a distance between the rear wheel and the centroid.

3. The vehicle behavior control device according to claim 1, wherein
the one or more actuators include at least a drive actuator configured to rotate the four wheels, a brake actuator configured to generate a braking force, a front wheel steering actuator configured to steer the front wheels, and a rear wheel steering actuator configured to steer the rear wheels.

* * * * *